United States Patent
Semitsu et al.

(10) Patent No.: US 11,580,407 B2
(45) Date of Patent: Feb. 14, 2023

(54) LEARNING DEVICE, SIGNAL PROCESSING DEVICE, AND LEARNING METHOD

(71) Applicant: MITSUBISHI ELECTRIC CORPORATION, Tokyo (JP)

(72) Inventors: Takayuki Semitsu, Tokyo (JP); Wataru Matsumoto, Tokyo (JP); Xiongxin Zhao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 893 days.

(21) Appl. No.: 16/325,348

(22) PCT Filed: Sep. 6, 2016

(86) PCT No.: PCT/JP2016/076138
§ 371 (c)(1),
(2) Date: Feb. 13, 2019

(87) PCT Pub. No.: WO2018/047225
PCT Pub. Date: Mar. 15, 2018

(65) Prior Publication Data
US 2019/0205764 A1 Jul. 4, 2019

(51) Int. Cl.
*G06N 3/08* (2006.01)
*G06N 3/04* (2006.01)
*G06N 3/086* (2023.01)

(52) U.S. Cl.
CPC ............. *G06N 3/086* (2013.01); *G06N 3/04* (2013.01); *G06N 3/08* (2013.01)

(58) Field of Classification Search
CPC ............. G06N 3/086; G06N 3/04; G06N 3/08
See application file for complete search history.

(56) References Cited

U.S. PATENT DOCUMENTS

| 2007/0122036 A1 | 5/2007 | Kaneda et al. |
| 2016/0140438 A1 | 5/2016 | Yang et al. |
| 2016/0259994 A1* | 9/2016 | Ravindran ............... G06N 3/04 |

FOREIGN PATENT DOCUMENTS

| JP | 4799104 B2 | 10/2011 |
| JP | 4799105 B2 | 10/2011 |
| JP | 2014-49118 A | 3/2014 |

OTHER PUBLICATIONS

Misra, Ishan, et al. "Cross-stitch networks for multi-task learning." Proceedings of the IEEE conference on computer vision and pattern recognition. 2016. (Year: 2016).*

(Continued)

*Primary Examiner* — Kakali Chaki
*Assistant Examiner* — Michael H Hoang
(74) *Attorney, Agent, or Firm* — Birch, Stewart, Kolasch & Birch, LLP (57) ABSTRACT

A learning data processing unit accepts, as input, a plurality of pieces of learning data for a respective plurality of tasks, and calculates, for each of the tasks, a batch size which meets a condition that a value obtained by dividing a data size of corresponding one of the pieces of learning data by the corresponding batch size is the same between the tasks. A batch sampling unit samples, for each of the tasks, samples from corresponding one of the pieces of learning data with the corresponding batch size calculated by the learning data processing unit. A learning unit updates a weight of a discriminator for each of the tasks, using the samples sampled by the batch sampling unit.

6 Claims, 7 Drawing Sheets

(56) References Cited

OTHER PUBLICATIONS

Li, Mu, et al. "Efficient mini-batch training for stochastic optimization." Proceedings of the 20th ACM SIGKDD international conference on Knowledge discovery and data mining. 2014. https://dl.acm.org/doi/pdf/10.1145/2623330.2623612 (Year: 2014).*

Moritz, Philipp, et al. "Sparknet: Training deep networks in spark." arXiv preprintarXiv:1511.06051 (2015). https://arxiv.org/pdf/1511.06051.pdf (Year: 2015).*

Li, Sijin, Zhi-Qiang Liu, and Antoni B. Chan. "Heterogeneous multi-task learning for human pose estimation with deep convolutional neural network." Proceedings of the IEEE conference on computer vision and pattern recognition workshops. 2014. (Year: 2014).*

[Item W continued] https://www.cv-foundation.org//openaccess/content_cvpr_workshops_2014/W15/papers/LI_Heterogeneous_Multi-task_Learning_2014_CVPR_paper.pdf.*

Thatte, Jayant, Vincent Sitzmann, and Timon Ruban. "The Essence of Pose." Jan.-Mar. 2016 https://jayantt.github.io/data/cs231n.pdf (Year: 2016).*

Ruvolo, Paul, and Eric Eaton. "Online multi-task learning via sparse dictionary optimization." Proceedings of the AAAI Conference on Artificial Intelligence. vol. 28. No. 1. 2014. https://ojs.aaai.org/index.php/AAAI/article/view/9022 (Year: 2014).*

Office Action issued in corresponding German Application No. 11 2016 007 110.8 dated Jan. 15, 2020.

Bishop, "Pattern Recognition and Machine Learning", Maruzen Publishing Co., Ltd., 2012, Total 46 pages.

Krizhevsky et al., "ImageNet Classification with Deep Convolutional Neural Networks", In Advances in neural information processing systems, 2012, pp. 1097-1105.

Zhang et al., "Facial Landmark Detection by Deep Multi-task Learning", European Conference on Computer Vision, Springer International Publishing, 2014, pp. 94-108.

Office Action dated Nov. 16, 2022 in corresponding Chinese Patent Application No. 201680088860.2.

* cited by examiner

LEARNING DEVICE, SIGNAL PROCESSING DEVICE, AND LEARNING METHOD

TECHNICAL FIELD

The invention relates to a learning device that learns a plurality of tasks of different types using a single neural network, a signal processing device including the learning device, and a learning method.

BACKGROUND ART

With an improvement in the computational speed of a computer, various information processing using a neural network becomes possible. The neural network is a computational model in which perceptrons are hierarchically arranged. A perceptron computes a weighted sum of input signals, performs computation using a nonlinear function called an activation function on the weighted sum, and outputs a result of the computation. Namely, when the input signal is $X=(x_1, x_2, \ldots, x_n)$, the weight is $W=(w_1, w_2, \ldots, w_n)$, and the activation function is $f(\cdot)$, the output out of the perceptron can be represented by $out=f(X*W)$. Note that $*$ is the product of vector components.

In addition, Patent Literature 1 describes a classifier system that uses a convolutional neural network. Perceptrons in the convolutional neural network use a two-dimensional signal, such as an image, as an input signal and use a sigmoid function or a ReLU function as an activation function. For a learning method for a neural network classifier included in the above-described classifier system, stochastic gradient descent is adopted. Stochastic gradient descent is a learning method in which instead of performing a weight update using backpropagation on the entire learning data, the operation of extracting a partial batch of samples from learning data and performing a weight update using the extracted samples is repeated the number of times corresponding to the number of iterations of a learning loop.

Furthermore, in recent years, there has been proposed a framework of so-called multi-task learning in which a plurality of tasks of different types is learned by a single neural network. Here, of special note is that even though tasks are of different types such as regression or classification, learning can be done successfully.

For example, Non-Patent Literature 1 describes a technique related to facial recognition by multi-task learning. In this technique, by performing learning with a combination of a classification task such as recognition of facial expression or estimation of face orientation and a regression task such as detection of facial feature points, the accuracy of recognition is increased.

CITATION LIST

Patent Literatures

Patent Literature 1: JP 2014-49118 A

Non-Patent Literatures

Non-Patent Literature 1: Z. Zhang, P. Luo, C. C. Loy, and X. Tang, "Facial landmark detection by deep multi-task learning", in European Conference on Computer Vision, 2014, pp. 94-108.

SUMMARY OF INVENTION

Technical Problem

The conventional multi-task learning by stochastic gradient descent is based on the premise that each sample in learning data is fully tagged with the labels for a plurality of tasks serving as learning targets. Note that the learning data is a data set including a plurality of samples. The sample is data in which data to be learned by a discriminator is combined with a label which is correct data for the data to be learned.

In addition, in the conventional multi-task learning by stochastic gradient descent, a batch size having the same value are determined for a plurality of pieces of learning data, and a value obtained by dividing a data size of the pieces of learning data by the batch size is the number of iterations of a learning loop.

By the above-described premise, the pieces of learning data have the same data size, and thus, by determining one batch size for a plurality of tasks, task-by-task sampling can be repeated with the same batch size.

However, in practice, there is a case in which learning data includes samples that are not fully tagged with the labels for a plurality of tasks serving as learning targets.

For example, when learning is performed with a combination of pieces of task-by-task learning data or when learning data for a single task is collected and then learning data for another task is added, samples are not tagged with the label for a task other than their corresponding task.

When samples are thus not fully tagged with the labels for all tasks serving as learning targets, the data size of learning data varies from task to task.

In this case, conventionally, there is no algorithm for determining batch sizes with which learning can be appropriately completed for each of the plurality of tasks, and thus, there is a problem that appropriate learning cannot be performed.

Note that adding a lacking label to samples that are not fully tagged with labels may be considered. However, a data set of learning data generally includes more than 10,000 samples, and thus, it requires an enormous amount of work to obtain and add a lacking label.

The invention is to solve the above-described problems, and an object of the invention is to obtain a learning device, a signal processing device, and a learning method that can appropriately perform multi-task learning by stochastic gradient descent even with the use of learning data including samples that are not fully tagged with the labels for a plurality of tasks serving as learning targets.

Solution to Problem

A learning device according to the invention includes a processor to execute a program, and a memory to store the program which, when executed by the processor, performs processes. The processes includes: accepting, as input, a plurality of pieces of learning data for a respective plurality of tasks, and calculating, for each of the tasks, a batch size which meets a condition that a value obtained by dividing a data size of corresponding one of the pieces of learning data by the corresponding batch size is same between the tasks: sampling. for each of the tasks, samples from corresponding one of the pieces of learning data with the corresponding batch size calculated; and updating a weight of a discriminator for each of the tasks, using the samples sampled.

Advantageous Effects of Invention

According to the invention, samples are sampled from each of the pieces of learning data with the corresponding batch size which meets a condition that a value obtained by dividing the data size of each of the pieces of learning data by the corresponding batch size is the same between the pieces of learning data.

By this, even with the use of learning data including samples that are not fully tagged with the labels for a plurality of tasks serving as learning targets, multi-task learning by stochastic gradient descent can be appropriately performed.

DESCRIPTION OF EMBODIMENTS

To describe the invention in more detail, modes for carrying out the invention will be described below with reference to the accompanying drawings.

First Embodiment

Figure 1:
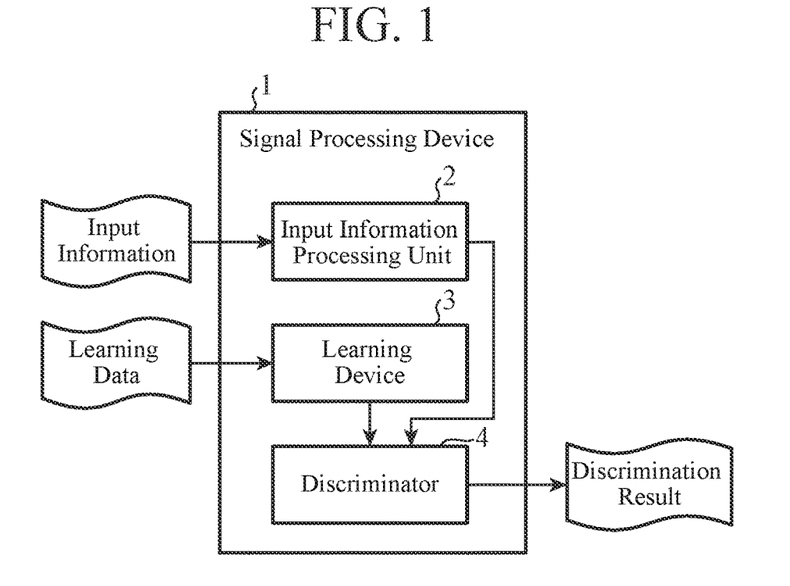
FIG. 1 is a block diagram showing an exemplary configuration of a signal processing device according to a first embodiment of the invention.

FIG. 1 is a block diagram showing an exemplary configuration of a signal processing device 1 according to a first embodiment of the invention. The signal processing device 1 is, for example, a device that functions as a recognition device for character recognition or face recognition, and includes an input information processing unit 2, a learning device 3, and a discriminator 4.

The input information processing unit 2 generates information used in a discrimination process from input information, and provides the generated information for the discriminator 4. For example, when the signal processing device 1 is an object detection device that detects an object from video data, the input information processing unit 2 extracts features of video from video data obtained as input information, and outputs information on the features of video to the discriminator 4.

The learning device 3 is a device that performs learning of the discriminator 4. Hereinafter, description is made assuming that the learning device 3 performs learning of the discriminator 4 using learning data for each of a task A and a task B of different types. An example of the tasks A and B of different types includes a classification task such as recognition of facial expression or estimation of face orientation, and a regression task such as detection of facial feature points.

A combination of tasks serving as learning targets is based on the premise that the features of input information used in the tasks are similar. Since the above-described estimation of face orientation and detection of facial feature points are similar in that facial features are captured, multi-task learning is possible.

Note that the extent to which this premise holds is that if multi-task learning can be appropriately performed, then the features of information used in tasks which are learning targets are also similar.

The discriminator 4 discriminates a target object or event on the basis of the information inputted from the input information processing unit 2. An example of the discriminator 4 includes a neural network shown in FIG. 2.

Figure 2:
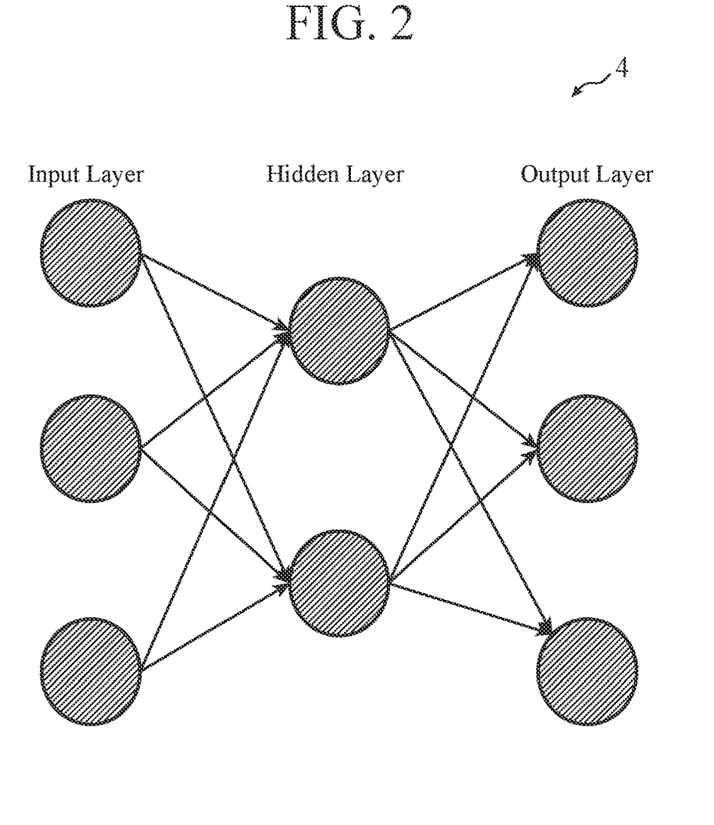
FIG. 2 is a diagram showing an example of a discriminator.

In the neural network, perceptrons which are nodes are hierarchically arranged, and by processing input information by perceptrons for each hierarchy in the order of an input layer, a hidden layer, and an output layer, discrimination results are calculated. The output layer corresponds to the output of a task to be discriminated, and in the case of a regression task, the output of an activation function is outputted as it is as a predicted value. In addition, in the case of a classification task, the output layer outputs a value to which a softmax function is applied.

Figure 3:
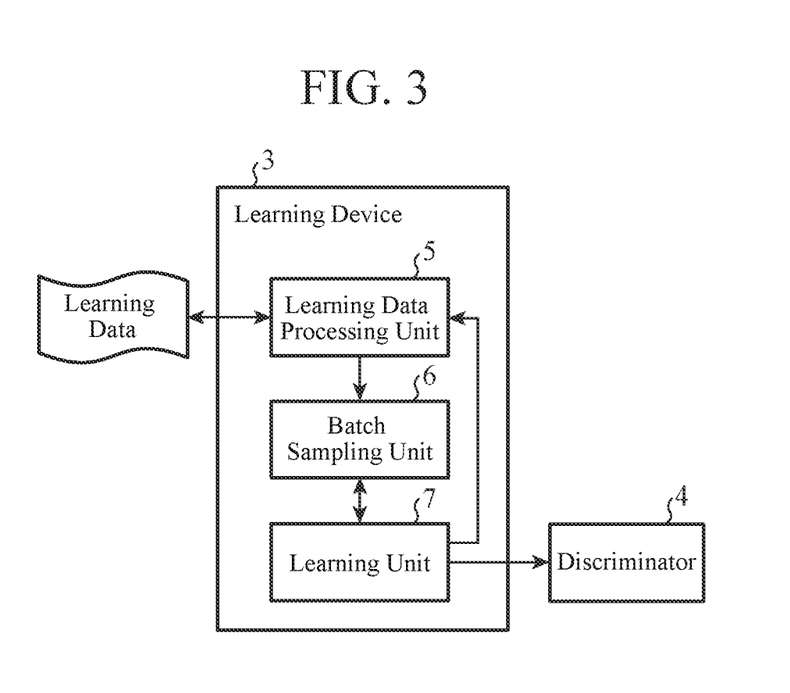
FIG. 3 is a block diagram showing an exemplary configuration of a learning device according to the first embodiment.

FIG. 3 is a block diagram showing an exemplary configuration of the learning device 3 according to the first embodiment.

The learning device 3 shown in FIG. 3 is a device that performs so-called multi-task learning in which the tasks A and B of different types are learned by a single neural network, and includes a learning data processing unit 5, a batch sampling unit 6, and a learning unit 7. In addition, the learning device 3 performs multi-task learning by stochastic gradient descent.

The learning data processing unit 5 calculates batch sizes which meet a condition that a value obtained by dividing a data size of each of the pieces of learning data by a corresponding one of the batch sizes is the same between the task A and the task B.

For example, when the data size and batch size of learning data for the task A are S1 and B1, respectively, and the data size and batch size of learning data for the task B are S2 and B2, respectively, the learning data processing unit 5 calculates B1 and B2 which meet S1/B1=S2/B2.

Note that the data size of learning data is the number of samples included in the learning data.

Note also that the batch size is the number of samples to be sampled at a time from the learning data.

The batch sampling unit 6 samples samples from the learning data for each task with the batch sizes calculated by the learning data processing unit 5.

Note that since the number of iterations of a single learning loop for the task A is S1/B1 and the number of iterations of a single learning loop for the task B is S2/B2, the timing at which a single learning loop is completed is the same between the task A and the task B.

In this manner, in learning of the task A sampling is appropriately performed with the batch size B1, and in learning of the task B sampling is appropriately performed with the batch size B2.

The learning unit 7 performs a weight update of the discriminator 4 by backpropagation, using the samples sampled in the learning loops for the task A and the task B.

In stochastic gradient descent, the weights of the discriminator 4 are updated using backpropagation.

Note that backpropagation is a method for updating a weight by propagating an output error of the neural network which is the discriminator 4 from the output layer to the input layer in turn.

Figure 4A:
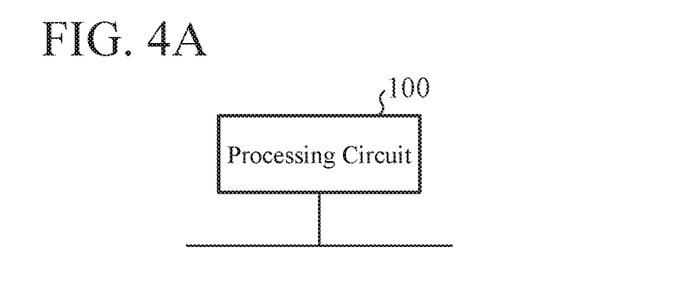
FIG. 4A is a block diagram showing a hardware configuration that implements the functions of the learning device according to the first embodiment.
Figure 4B:
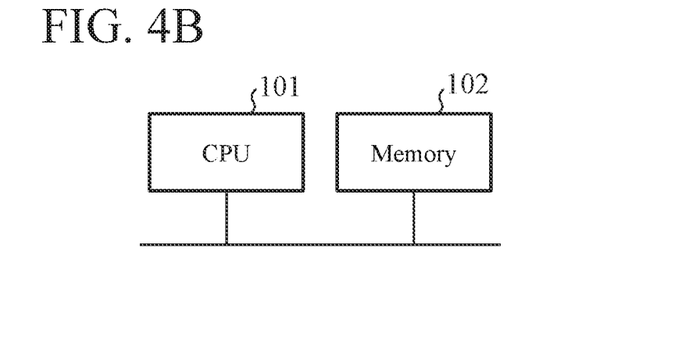
FIG. 4B is a block diagram showing a hardware configuration that executes software that implements the functions of the learning device according to the first embodiment.

In addition, FIG. 4A is a block diagram showing a hardware configuration that implements the functions of the learning device 3. FIG. 4B is a block diagram showing a hardware configuration that executes software that implements the functions of the learning device 3. The functions of the learning data processing unit 5, the batch sampling unit 6, and the learning unit 7 in the learning device 3 are implemented by a processing circuit. Namely, the learning device 3 includes a processing circuit for performing those functions one by one.

The processing circuit may be dedicated hardware or may be a central processing unit (CPU) or a graphics processing unit (GPU) that reads and executes programs stored in a memory.

When the processing circuit is a processing circuit 100 which is dedicated hardware shown in FIG. 4A, the processing circuit 100 corresponds, for example, to a single circuit, a combined circuit, a programmed processor, a parallel programmed processor, an application specific integrated circuit (ASIC), a field-programmable gate array (FPGA), or a combination thereof.

In addition, a function of each of the learning data processing unit 5, the batch sampling unit 6, and the learning unit 7 may be implemented by a processing circuit, or the functions of the respective units may be all together implemented by a single processing circuit.

When the above-described processing circuit is a CPU 101 such as that shown in FIG. 4B, the functions of the learning data processing unit 5, the batch sampling unit 6, and the learning unit 7 are implemented by software, firmware, or a combination of software and firmware.

The software and the firmware are described as programs and stored in a memory 102. The CPU 101 implements the function of each unit by reading and executing the programs stored in the memory 102. Namely, the memory 102 for storing programs that consequently perform each function when executed by the CPU 101 is provided.

In addition, those programs cause a computer to perform procedures or methods for the learning data processing unit 5, the batch sampling unit 6, and the learning unit 7.

Here, the memory corresponds, for example, to a non-volatile or volatile semiconductor memory such as a random access memory (RAM), a ROM, a flash memory, an erasable programmable ROM (EPROM), or an electrically EPROM (EEPROM), a magnetic disk, a flexible disk, an optical disc, a compact disc, a MiniDisc, or a digital versatile disc (DVD).

Note that some of the functions of the learning data processing unit 5, the batch sampling unit 6, and the learning unit 7 may be implemented by dedicated hardware and some of the functions may be implemented by software or firmware. For example, the learning data processing unit 5 implements its function by the processing circuit 100 which is dedicated hardware, and the batch sampling unit 6 and the learning unit 7 implement their functions by the CPU 101 executing programs stored in the memory 102.

As such, the above-described processing circuit can implement the aforementioned functions by hardware, software, firmware, or a combination thereof.

Figure 5A:
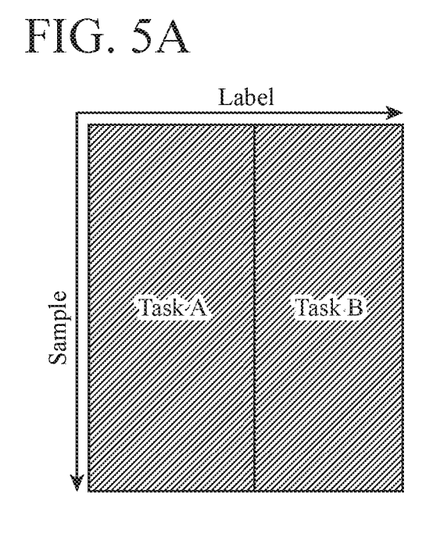
FIG. 5A is a diagram showing an overview of learning data including samples that are fully tagged with labels for both of a task A and a task B.
Figure 5B:
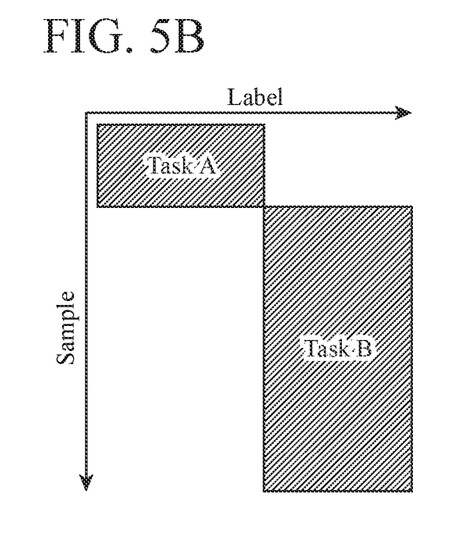
FIG. 5B is a diagram showing an overview of learning data including samples each tagged with a label for either one of the task A and the task B.

In addition, FIG. 5A is a diagram showing an overview of learning data including samples that are fully tagged with labels for both the task A and the task B. FIG. 5B is a diagram showing an overview of learning data including samples each tagged with a label for either one of the task A and the task B.

In FIG. 5A, the samples in the learning data for the task A are fully tagged with the labels of both the task A and the task B, and the samples in the learning data for the task B are fully tagged with the labels of both the task A and the task B.

In this case, as shown in FIG. 5A, the data sizes of the learning data for the task A and the learning data for the task B have the same value. Hence, even though one batch size is set for the task A and the task B, sampling with this batch size can be appropriately performed for the task A and the task B.

On the other hand, in FIG. 5B, the learning data for the task A is tagged with only the label of the task A, and the learning data for the task B is tagged with only the label of the task B. Hence, as shown in FIG. 5B, the data size of the learning data for the task A differs from the data size of the learning data for the task B.

In this case, conventionally, there is no algorithm for determining batch sizes with which learning can be appropriately completed for the task A and the task B.

Hence, the learning device 3 according to the first embodiment samples samples from the pieces of learning data for the task A and for the task B with batch sizes which meet the condition that a value obtained by dividing the data size of each of the pieces of learning data by the corresponding one of the batch sizes is the same between the pieces of learning data.

By this, even with the use of learning data including samples that are not fully tagged with either one of the label for the task A and the label for the task B, multi-task learning by stochastic gradient descent can be appropriately performed.

Next, operation will be described.

Figure 6:
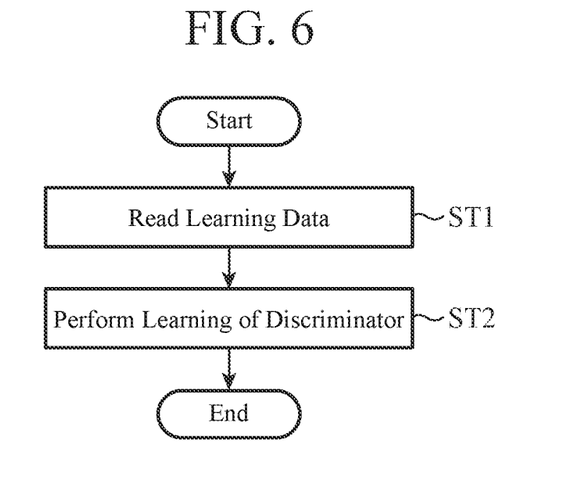
FIG. 6 is a flowchart showing the operation of the learning device according to the first embodiment.

FIG. 6 is a flowchart showing the operation of the learning device 3, and shows a series of processes for performing learning of the discriminator 4.

First, the learning device 3 reads learning data (step ST1) and performs learning of the discriminator 4 using the learning data (step ST2). Here, multi-task learning by stochastic gradient descent is performed using learning data for each of the task A and the task B.

Figure 7:
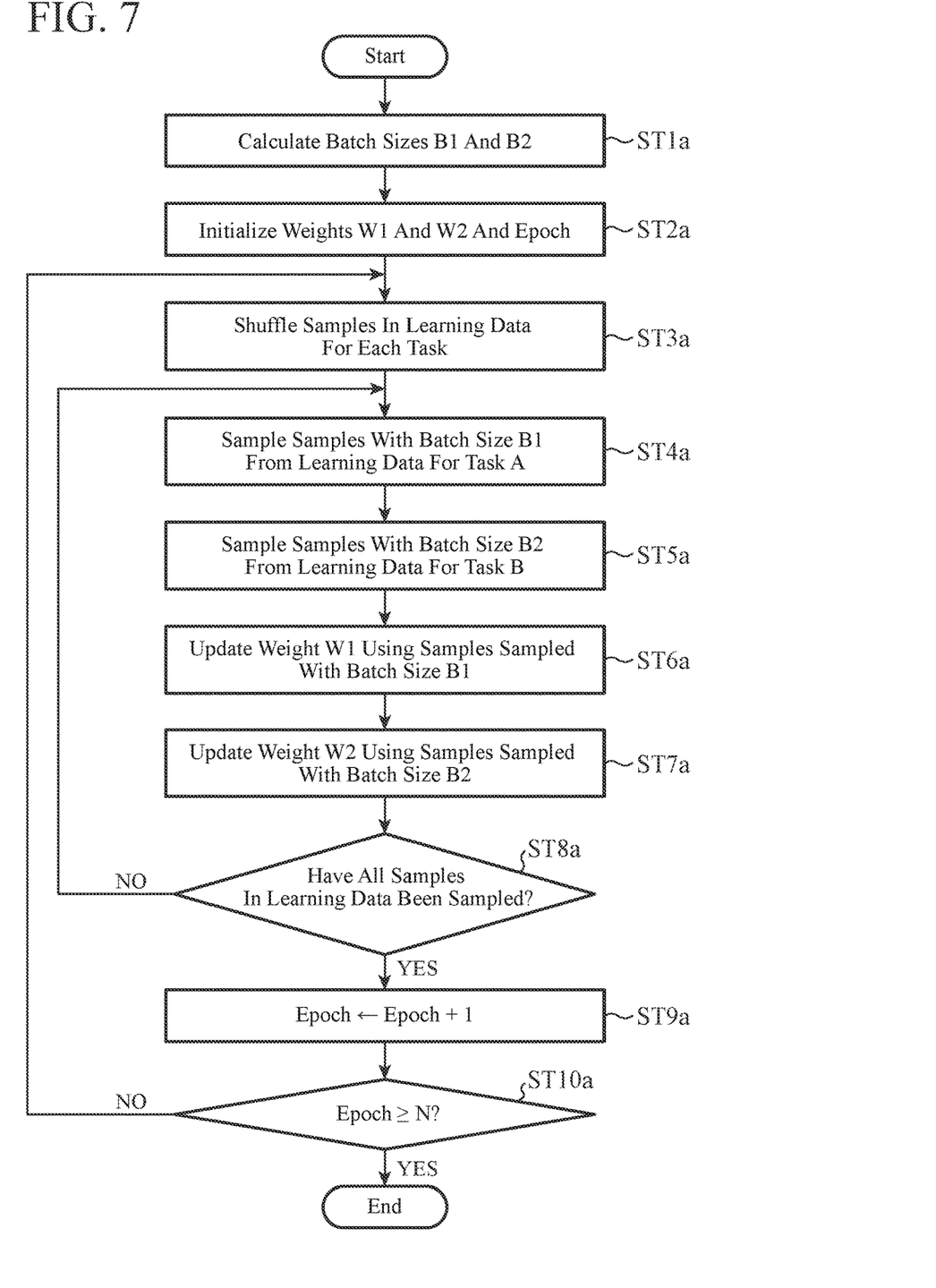
FIG. 7 is a flowchart showing a detail of a process at step ST2 of FIG. 6.

FIG. 7 is a flowchart showing a detail of the process at step ST2 of FIG. 6, and shows a series of processes for multi-task learning by stochastic gradient descent.

First, the learning data processing unit 5 calculates a batch size B1 for the task A and a batch size B2 for the task B (step ST1a).

Here, the learning data processing unit 5 accepts, as input, learning data for the task A and learning data for the task B, and calculates batch sizes B1 and B2 on the basis of the data sizes of the pieces of learning data. Specifically, when the data size of the learning data for the task A is S1 and the data size of the learning data for the task B is S2, B1 and B2 which meet S1/B1=S2/B2 are calculated.

For example, when S1=50 and S2=100, the batch size for the task A is B1=2 and the batch size for the task B is B2=4.

Subsequently, the learning data processing unit 5 initializes a weight W1 to be updated with the learning data for the task A and a weight W2 to be updated with the learning data for the task B in the discriminator 4, and further initializes an epoch (step ST2a).

The epoch is a learning loop in which all samples in the learning data are used once.

Note that for the task A, sampling is repeated S1/B1 times in one epoch and for the task B, sampling is repeated S2/B2 times in one epoch.

Then, the learning data processing unit 5 shuffles the samples of the learning data for the task A and shuffles the samples of the learning data for the task B (step ST3a).

Note that shuffling of the samples refers to any rearrangement of the order of samples to be sampled from the learning data.

Subsequently, the batch sampling unit 6 samples samples with the batch size B1 from the learning data for the task A out of the pieces of learning data whose samples have been shuffled by the learning data processing unit 5 (step ST4a).

Furthermore, the batch sampling unit 6 samples samples with the batch size B2 from the learning data for the task B out of the learning pieces of data whose samples have been shuffled by the learning data processing unit 5 (step ST5a).

The learning unit 7 updates the weight W1 of the discriminator 4 using the samples sampled with the batch size B1 by the batch sampling unit 6 (step ST6a).

Furthermore, the learning unit 7 updates the weight W2 of the discriminator 4 using the samples sampled with the batch size B2 by the batch sampling unit 6 (step ST7a).

Thereafter, the learning unit 7 determines whether all samples have been sampled from the learning data for the task A and the learning data for the task B (step ST8a).

If all samples have not been sampled from the pieces of learning data (step ST8a; NO), the learning unit 7 notifies the batch sampling unit 6 of such a fact.

When the batch sampling unit 6 receives the notification from the learning unit 7, the batch sampling unit 6 samples next batches from the pieces of learning data. By this, a series of processes from step ST4a are repeated.

On the other hand, if all samples have been sampled from the pieces of learning data (step ST8a; YES), the learning unit 7 notifies the learning data processing unit 5 of such a fact.

When the learning data processing unit 5 receives the notification from the learning unit 7, the learning data processing unit 5 increments the epoch by one (step ST9a).

Thereafter, the learning data processing unit 5 determines whether the epoch is greater than or equal to a predetermined number of iterations N (step ST10a).

If the epoch is less than the number of iterations N (step ST10a; NO), the learning data processing unit 5 returns to step ST3a and repeats the aforementioned series of processes.

In addition, if the epoch is greater than or equal to the number of iterations N (step ST10a; YES), the processes end. Note that since S1/B1=S2/B2, the timing at which a single epoch is completed is the same between the task A and the task B.

Figure 8:
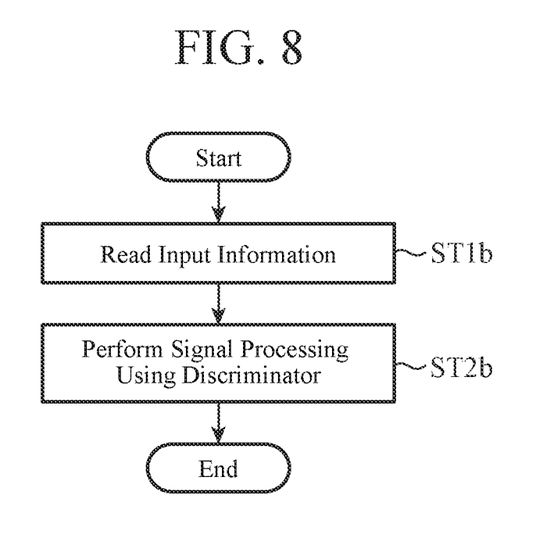
FIG. 8 is a flowchart showing the operation of a signal processing device according to the first embodiment.

FIG. 8 is a flowchart showing the operation of the signal processing device 1, and shows a series of processes up to the point where signal processing by the discriminator 4 is performed.

First, the input information processing unit 2 reads input information (step ST1b).

The discriminator 4 performs signal processing for discriminating a target object or event, on the basis of the information inputted from the input information processing unit 2 (step ST2b).

In the first embodiment, even with the use of learning data including samples that are not fully tagged with the labels for the task A and the task B, batch sizes can be appropriately set.

By this, multi-task learning by stochastic gradient descent using a plurality of pieces of learning data with different data sizes can be implemented.

For example, it is possible to appropriately construct a neural network that performs a task of detection of feature points and a task of recognition of facial expression.

Note that the discriminator 4 of the first embodiment may be any as long as the discriminator 4 performs learning using stochastic gradient descent. Namely, the learning device 3 can be used for, for example, learning of a convolutional neural network (CNN), a deep neural network (DNN), a recurrent neural network (RNN), a long short-term memory (LSTM), or an autoencoder.

In addition, although the first embodiment shows a case in which the task A and the task B are learned by the discriminator 4, a learning algorithm by the learning device 3 can be applied to multi-task learning for three or more tasks.

For example, when a task A, a task B, and a task C are learning targets and the task A is a reference task, for the task B and the task C, respective batch sizes are determined on the basis of the number of iterations for the reference task.

As described above, the learning device 3 according to the first embodiment includes the learning data processing unit 5, the batch sampling unit 6, and the learning unit 7. In this configuration, samples are sampled for individual tasks with respective batch sizes which meet the condition that a value obtained by dividing the data size of each of the pieces of learning data by the corresponding one of the batch sizes is the same between the pieces of learning data.

By this, even with the use of learning data including samples that are not fully tagged with the labels for a plurality of tasks serving as learning targets, multi-task learning by stochastic gradient descent can be appropriately performed.

In addition, the signal processing device 1 according to the first embodiment includes the input information processing unit 2, the learning device 3, and the discriminator 4. By having this configuration, multi-task learning by stochastic gradient descent can be performed using learning data including samples that are not fully tagged with the labels for a plurality of tasks serving as learning targets.

Second Embodiment

In a second embodiment, multi-task learning is performed with batch sizes whose ratio has a fixed value between respective tasks.

Figure 9:
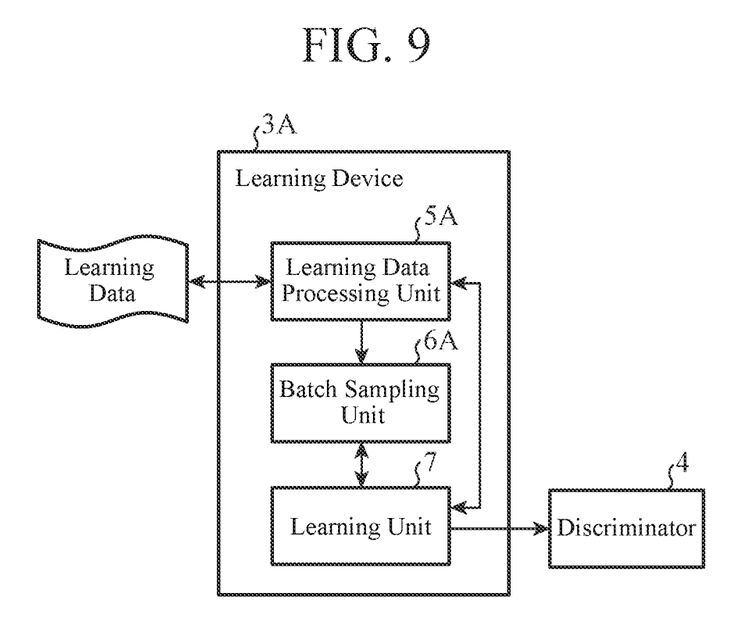
FIG. 9 is a block diagram showing an exemplary configuration of a learning device according to a second embodiment of the invention.

FIG. 9 is a block diagram showing a configuration of a learning device 3A according to the second embodiment of the invention, and the same components as those of FIG. 3 are denoted by the same reference signs and description thereof is omitted.

The learning device 3A shown in FIG. 9 is a device that performs so-called multi-task learning in which tasks A and B of different types are learned by a single neural network, and includes a learning data processing unit 5A, a batch sampling unit 6A, and a learning unit 7.

In addition, as in the first embodiment, the learning device 3A performs multi-task learning by stochastic gradient descent.

The learning data processing unit 5A accepts, as input, a plurality of pieces of learning data for a respective plurality of tasks, and calculates, for the tasks, respective batch sizes whose ratio has a fixed value between the tasks. For example, when the batch size of learning data for the task A is B1, the batch size of learning data for the task B is B2, and the fixed value is R, the learning data processing unit 5A calculates B1 and B2 which meet B1/B2=R.

The batch sampling unit 6A samples samples from the learning data for each task with a corresponding one of the batch sizes calculated by the learning data processing unit 5A.

Note that because the number of iterations of a single learning loop for the task A differs from the number of iterations of a single learning loop for the task B, the task A and the task B require different loop processes from each other.

In addition, as described using FIGS. 4A and 4B in the first embodiment, the functions of the learning data processing unit 5A, the batch sampling unit 6A, and the learning unit 7 of the learning device 3A are implemented by a processing circuit. Namely, the learning device 3A includes a processing circuit for performing those functions one by one. The processing circuit may be dedicated hardware or may be a CPU or a GPU that reads and executes programs stored in a memory.

Next, operation will be described.

Figure 10:
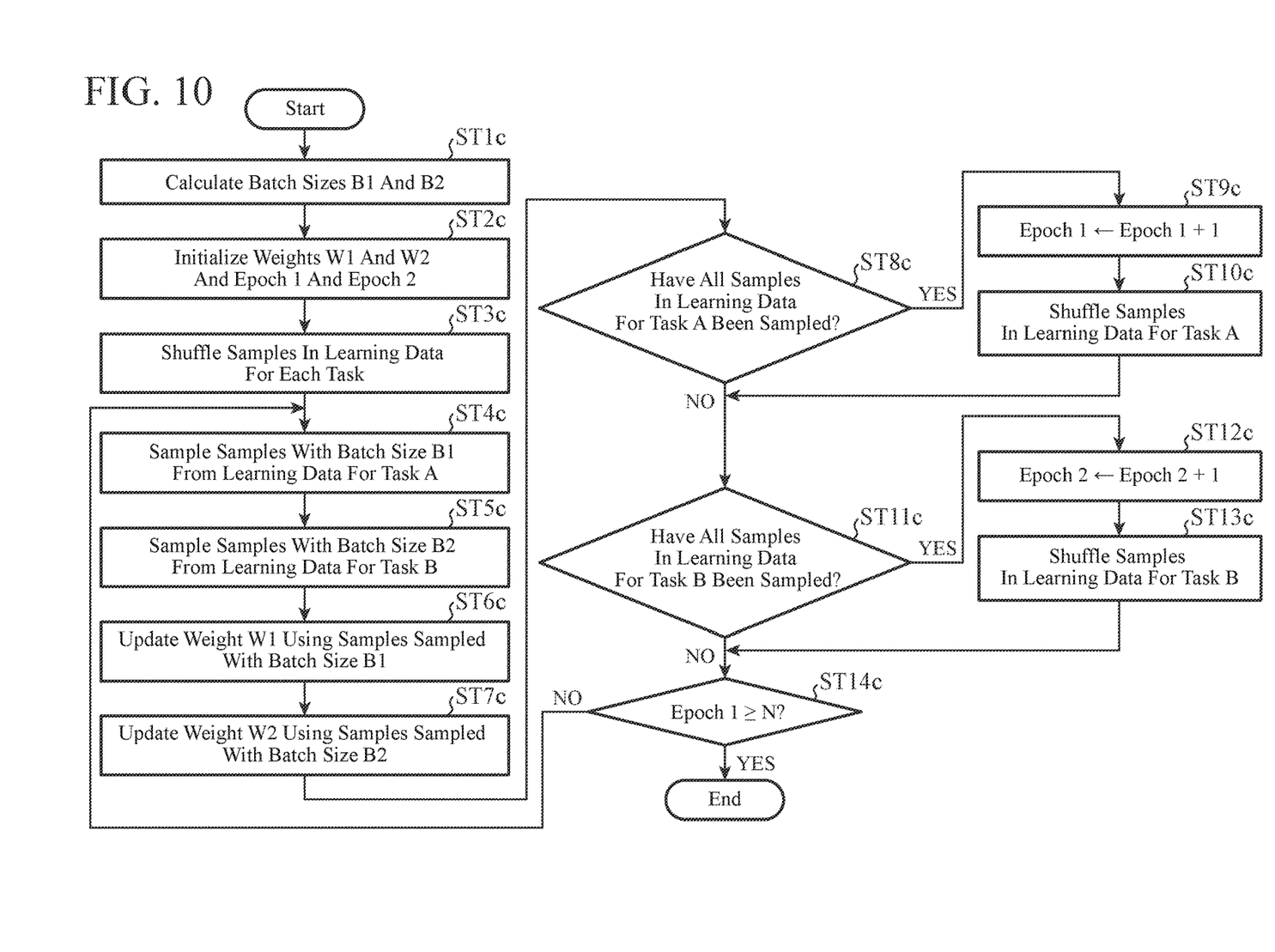
FIG. 10 is a flowchart showing the operation of the learning device according to the second embodiment.

FIG. 10 is a flowchart showing the operation of the learning device 3A, and shows a series of processes for multi-task learning by stochastic gradient descent.

The learning data processing unit 5A calculates a batch size B1 for the task A and a batch size B2 for the task B (step ST1c). Here, the learning data processing unit 5A calculates B1 and B2 which meet B1/B2=R.

For example, when the data size of learning data for the task A is S1=50, the data size of learning data for the task B is S2=100, and the fixed ratio is R=0.5, since B1/B2=0.5, B1=2 and B2=4.

Subsequently, the learning data processing unit 5A initializes a weight W1 to be updated with the learning data for the task A and a weight W2 to be updated with the learning data for the task B, and initializes an epoch 1 for the task A and an epoch 2 for the task B (step ST2c).

The learning data processing unit 5A shuffles the samples of the learning data for the task A and shuffles the samples of the learning data for the task B (step ST3c).

The batch sampling unit 6A samples samples with the batch size B1 from the learning data for the task A out of the pieces of learning data whose samples have been shuffled by the learning data processing unit 5A (step ST4c). In addition, the batch sampling unit 6A samples samples with the batch size B2 from the learning data for the task B out of the pieces of learning data whose samples have been shuffled by the learning data processing unit 5A (step ST5c).

The learning unit 7 updates the weight W1 of a discriminator 4 using the samples sampled with the batch size B1 by the batch sampling unit 6A (step ST6c).

Furthermore, the learning unit 7 updates the weight W2 of the discriminator 4 using the samples sampled with the batch size B2 by the batch sampling unit 6A (step ST7c).

Then, the learning unit 7 determines whether all samples have been sampled from the learning data for the task A (step ST8c).

If all samples have been sampled from the learning data for the task A (step ST8c; YES), the learning unit 7 notifies the learning data processing unit 5A of such a fact.

When the learning data processing unit 5A receives the notification from the learning unit 7, the learning data processing unit 5A increments the epoch 1 by one (step ST9c). Then, the learning data processing unit 5A shuffles the samples of the learning data for the task A (step ST10c). Thereafter, the learning data processing unit 5A notifies the learning unit 7 of the completion of the process at step ST10c.

When there are unprocessed samples in the learning data for the task A (step ST8c; NO) or step ST10c is completed, the learning unit 7 determines whether all samples have been sampled from the learning data for the task B (step ST11c).

Here, if all samples have been sampled from the learning data for the task B (step ST11c; YES), the learning unit 7 notifies the learning data processing unit 5A of such a fact.

When the learning data processing unit 5A receives the notification from the learning unit 7, the learning data processing unit 5A increments the epoch 2 by one (step ST12c). Then, the learning data processing unit 5A shuffles the samples of the learning data for the task B (step ST13c).

Note that in the second embodiment the number of iterations of an epoch is determined with reference to the task A. Hence, when there are unprocessed samples in the learning data for the task B (step ST11c; NO) or the process at step ST13c is completed, the learning data processing unit 5A determines whether the epoch 1 is greater than or equal to N (step ST14c).

If the epoch 1 is less than N (step ST14c; NO), the learning data processing unit 5A returns to step ST4c and repeats the aforementioned series of processes.

In addition, if the epoch 1 is greater than or equal to the number of iterations N (step ST14c; YES), the processes end. Namely, the processes end not depending on the number of iterations of the epoch 2 for the task B but depending on the number of iterations of the epoch 1 for the task A.

As described above, the learning device 3A according to the second embodiment includes the learning data processing unit 5A, the batch sampling unit 6A, and the learning unit 7. In this configuration, samples are sampled for individual tasks with respective batch sizes whose ratio has a fixed value between the tasks. By this, even with the use of learning data including samples that are not fully tagged with the labels for a plurality of tasks serving as learning targets, multi-task learning by stochastic gradient descent can be appropriately performed.

In addition, a signal processing device 1 according to the second embodiment includes an input information processing unit 2, the learning device 3A, and the discriminator 4. Even with such a configuration, multi-task learning by stochastic gradient descent can be performed using learning data including samples that are not fully tagged with the labels of a plurality of tasks serving as learning targets.

Note that although the first embodiment and the second embodiment show the signal processing device 1 including the learning device 3 or the learning device 3A, the learning device 3 or the learning device 3A may be provided separately from the signal processing device 1. For example, a signal processing device 1A shown in FIG. 11 includes the input information processing unit 2 and the discriminator 4, but the learning device 3 is provided separately from the signal processing device 1A.

Note that the discriminator 4 is learned by the learning device 3.

Figure 11:
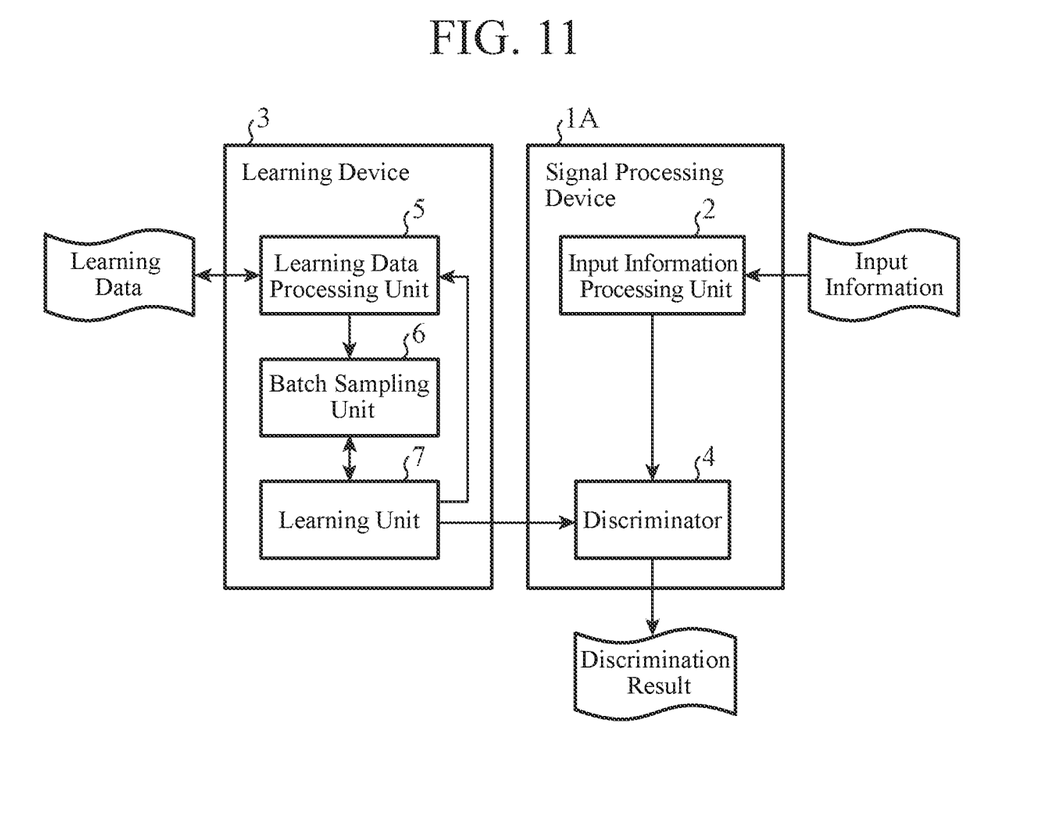
FIG. 11 is a block diagram showing another exemplary configuration of a signal processing device.

Although in FIG. 11 the configuration is that the learning device 3 and the signal processing device 1A cooperate with each other, the configuration may be that the signal processing device 1A cooperates with the learning device 3A. Even with such a configuration, the same advantageous effect as that described above can be obtained in learning of the discriminator 4.

Note that in the invention a free combination of the embodiments, modifications to any component of the embodiments, or omissions of any component in the embodiments are possible within the scope of the invention.

INDUSTRIAL APPLICABILITY

Learning devices according to the invention can appropriately perform multi-task learning by stochastic gradient descent even with the use of learning data sets including samples that are not fully tagged with the labels for a plurality of tasks serving as learning targets, and thus are suitable as learning devices for a discriminator that performs character recognition, etc.

REFERENCE SIGNS LIST 1 and 1A: Signal processing device, 2: Input information processing unit, 3 and 3A: Learning device, 4: Discriminator, 5 and 5A: Learning data processing unit, 6 and 6A: Batch sampling unit, 7: Learning unit, 100: Processing circuit, 101: CPU, and 102: Memory

The invention claimed is:

1. A learning device for training a single neural network for a plurality of tasks of different types using learning data whose data size varies from task to task, comprising:
 a processor to execute a program; and
 a memory to store the program which, when executed by the processor, performs multi-task training of the neural network using stochastic gradient descent by performing processes of,
 accepting, as input, corresponding learning data, having a corresponding data size, for each of the plurality of tasks, the corresponding data size for each task varying from task to task;
 calculating, for each of the plurality of tasks, a corresponding batch size which meets a condition that a value obtained by dividing the data size of the corresponding learning data for a task by the corresponding batch size for the task is the same between the plurality of tasks;
 sampling, for each of the plurality of tasks, samples from the corresponding learning data with the calculated corresponding batch size;
 training the single neural network by updating a corresponding weight of a discriminator of the neural network for each of the plurality of tasks, using the samples sampled;
 and
 repeating the sampling and training until all samples in the learning data have been sampled.

2. A learning device for training a single neural network for a plurality of tasks of different types using learning data whose data size varies from task to task, comprising:
 a processor to execute a program; and
 a memory to store the program which, when executed by the processor, performs multi-task training of the neural network using stochastic gradient descent by performing processes of,
 accepting, as input, corresponding learning data for each of the plurality of tasks, the corresponding learning data for each task having a corresponding data size, the corresponding data size for each task varying from task to task;
 calculating, for the plurality of tasks, a respective batch size whose ratio to the corresponding data size for the task has a fixed value between the plurality of tasks;
 sampling, for each of the plurality of tasks, samples from the corresponding learning data with calculated corresponding batch size;
 training the single neural network by updating a corresponding weight of a discriminator of the neural network for each of the plurality of tasks, using the samples sampled;
 and
 repeating the sampling and training until all samples in the learning data have been sampled.

3. A signal processing device comprising:
 an input information processor to accept input of input information; and
 a discriminator to perform a discrimination process using the input information accepted by the input information processor, the discriminator being caused to learn by the learning device according to claim 1.

4. A signal processing device comprising:
 an input information processor to accept input of input information; and
 a discriminator to perform a discrimination process using the input information accepted by the input information processor, the discriminator being caused to learn by the learning device according to claim 2.

5. A learning method of performing multi-task training of a single neural network using stochastic gradient descent for a plurality of tasks of different types using learning data whose data size varies from task to task, the method comprising:
 accepting, as input, corresponding learning data, having a corresponding data size for each of the plurality of tasks, the corresponding data size for each task varying from task to task;
 calculating, for each of the plurality of tasks, a corresponding batch size which meets a condition that a value obtained by dividing the data size of the corresponding learning data for a task by the corresponding batch size for the task is the same between the plurality of tasks;
 sampling, for each of the plurality of tasks, samples from the corresponding learning data with the calculated corresponding batch size;
 training the single neural network by updating, a corresponding weight of a discriminator of the neural network for each of the plurality of tasks, using the samples sampled;
 and
 repeating the sampling and training until all samples in the learning data have been sampled.

6. A learning method of performing multi-task training of a single neural network using stochastic gradient descent for a plurality of tasks of different types using learning data whose data size varies from task to task, the method comprising:
- accepting, as input, corresponding learning data, having a corresponding data size, for each of the plurality of tasks, the corresponding data size for each task varying from task to task;
- calculating, for the plurality of tasks, a respective batch size whose ratio to the corresponding data size for the task has a fixed value between the plurality of tasks;
- sampling, for each of the plurality of tasks, samples from the corresponding learning data with the calculated corresponding batch size;
- training the single neural network by updating, a corresponding weight of a discriminator of the neural network for each of the plurality of tasks, using the samples sampled; and
- repeating the sampling and training until all samples in the learning data have been sampled.

* * * * *